Figure 1:
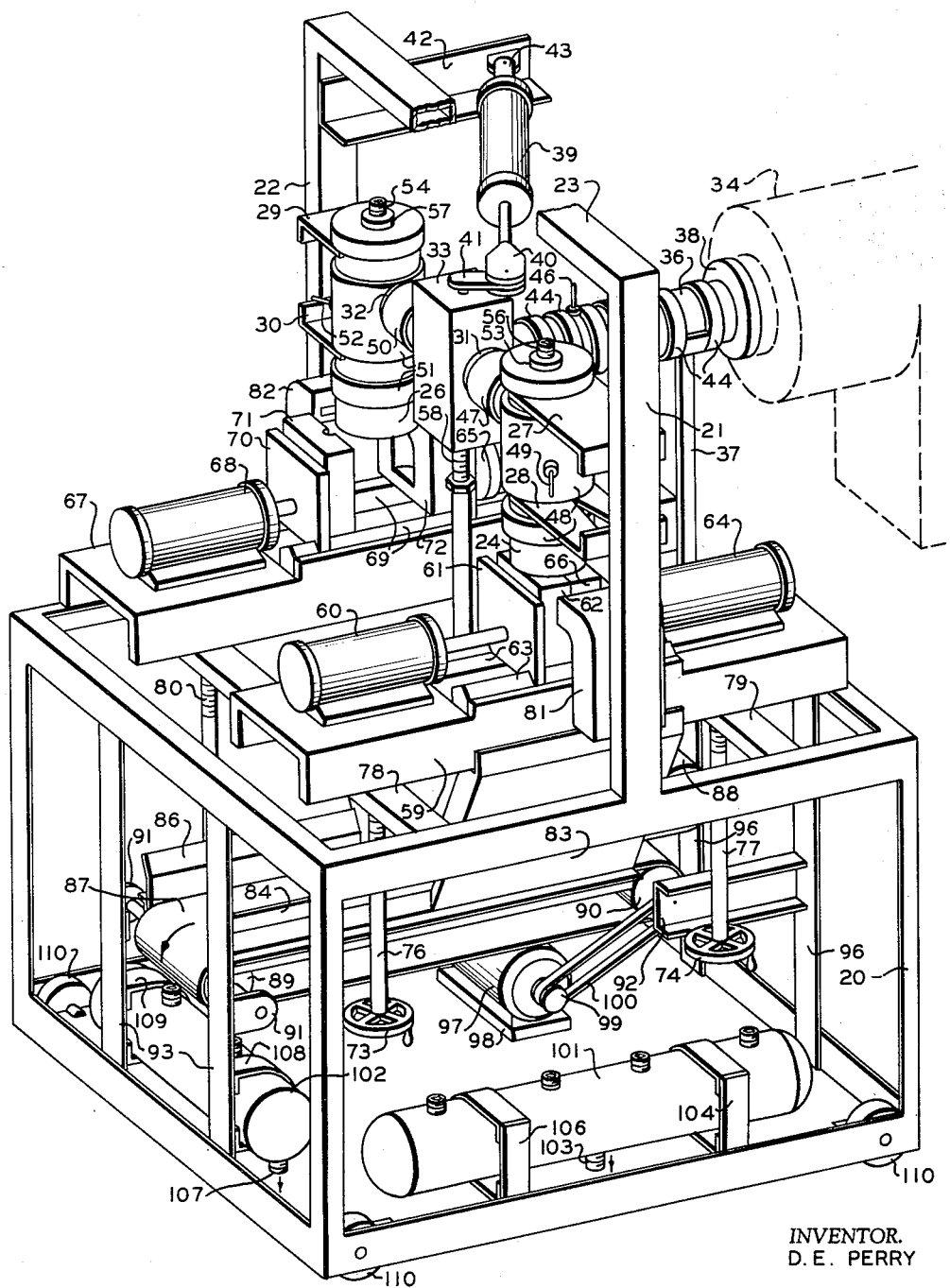

July 17, 1962 D. E. PERRY 3,044,112
EXTRUSION BLOWING APPARATUS
Filed Feb. 1, 1960 9 Sheets-Sheet 1

INVENTOR.
D. E. PERRY
BY Hudson & Young
ATTORNEYS

INVENTOR.
D. E. PERRY
BY Hudson & Young
ATTORNEYS

July 17, 1962 D. E. PERRY 3,044,112
EXTRUSION BLOWING APPARATUS
Filed Feb. 1, 1960 9 Sheets-Sheet 4

INVENTOR.
D. E. PERRY
BY Hudson & Young
ATTORNEYS

United States Patent Office 3,044,112
Patented July 17, 1962

3,044,112
EXTRUSION BLOWING APPARATUS
Daniel E. Perry, Bartlesville, Okla., assignor to Phillips Petroleum Company, a corporation of Delaware
Filed Feb. 1, 1960, Ser. No. 6,050
7 Claims. (Cl. 18—5)

This invention relates to apparatus for extrusion blow molding thermoplastic material. In another aspect it relates to apparatus for the continuous extrusion and cyclic blow molding of hollow articles from polymer such as polyethylene.

The advent of the deformable plastic "squeeze" bottle has placed great emphasis upon the development of equipment suitable for mass production of such items. Many fabricators require relatively small and versatile blow molding apparatus which can be readily adjusted to provide a wide range of variables which may be dictated by the polymer used or the type of article produced. The apparatus of my invention meets such a need.

According to my invention apparatus is provided which permits utilization of conventional extrusion equipment for the extrusion of plastic articles. The apparatus comprises basically two units: (1) forming and blowing apparatus which connects to a conventional extruder, and (2) a control circuit which operates the forming apparatus in a cyclic fashion while permitting continuous operation of the extruder. The forming and blowing apparatus comprises two tubing die heads positioned for downward extrusion, each of said die heads being equipped with a mandrel containing a central bore, valved conduit means for alternately supplying molten polymer in a substantially continuous stream from the extruder to each of said die heads, two pairs of opposing mold halves which can be positioned immediately below each of the die heads, each mold half being movable horizontally to and from a position in registry with the orifice of its associated die head, means for introducing gas under pressure to the bore of each of said mandrels, and two power actuated knife blades, each of which is positioned adjacent to one of the die heads so that the path of the blade lies along the face of the die head and intercepts the path of the extrudate.

The control circuit or automatic timing means which operates the forming apparatus in an established cycle comprises two timers, each of which has a plurality of contacts which close and open at preset intervals during the operation of the timers, said said contacts including a first set in each timer which completes the circuit that provides power for operation of that timer, a second set of contacts in each timer which completes the circuit that initiates the operation of the other timer, a third set of contacts which completes the circuit operably connected to the valved conduit means in the forming apparatus, a fourth and fifth set of contacts which complete circuits operably connected to air cylinders which motivate the mold halves, a sixth set of contacts which complete a circuit that operates the blowing gas which is introduced to the bore of the mandrels and a seventh set of contacts in each timer that completes the circuit controlling the operation of the knife blades.

Figure 2:
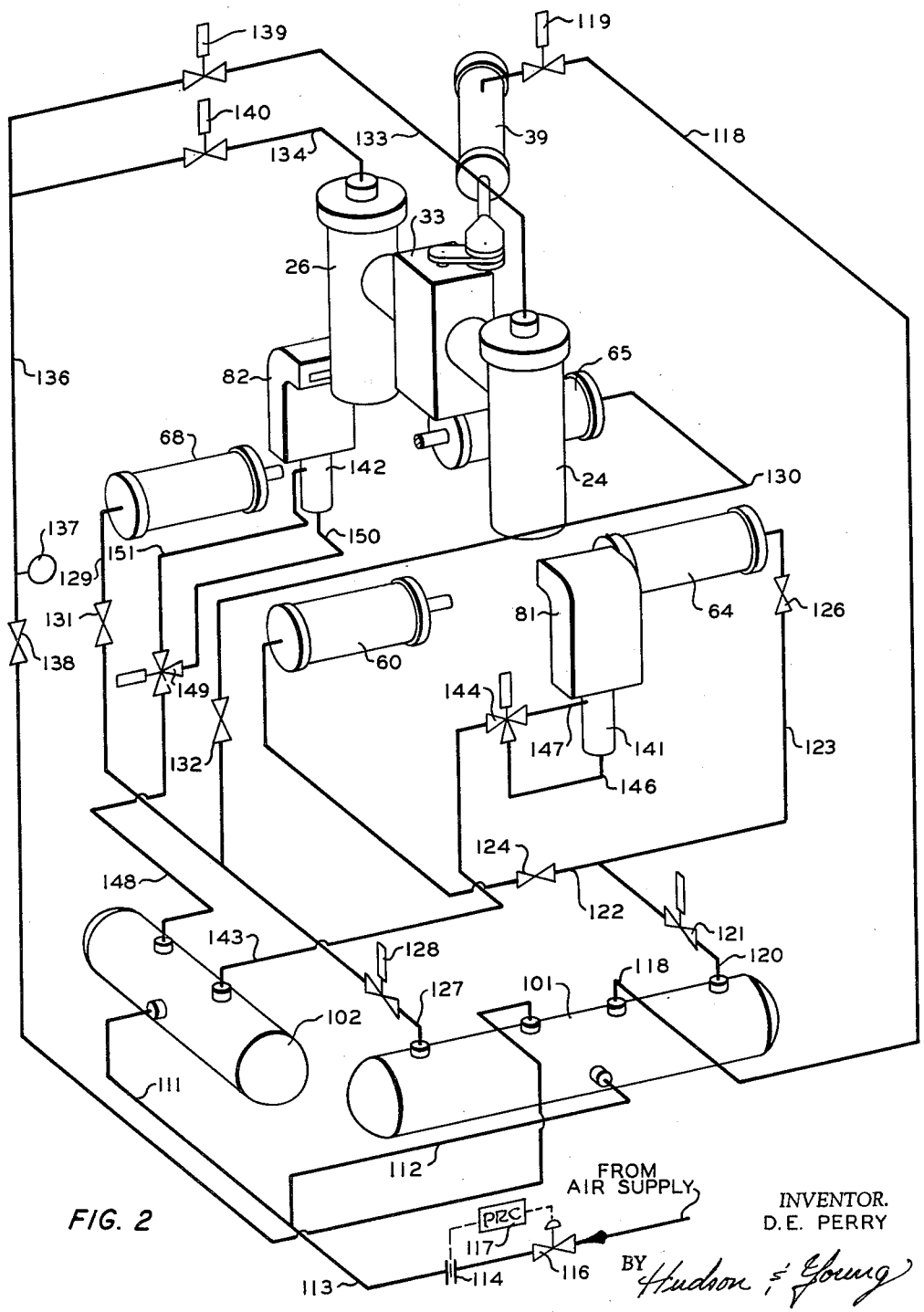
Figures 3, 4:
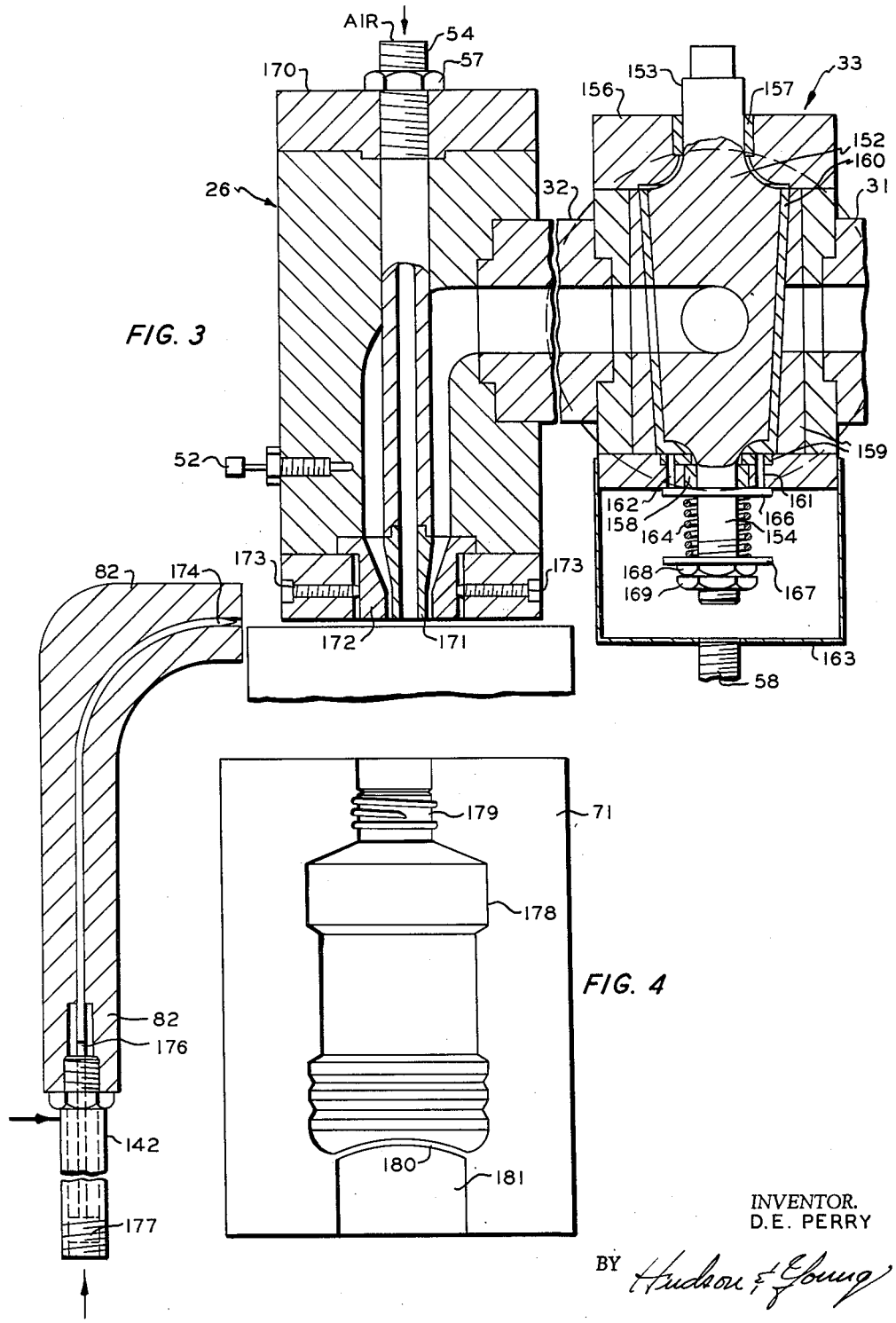
Figure 5:
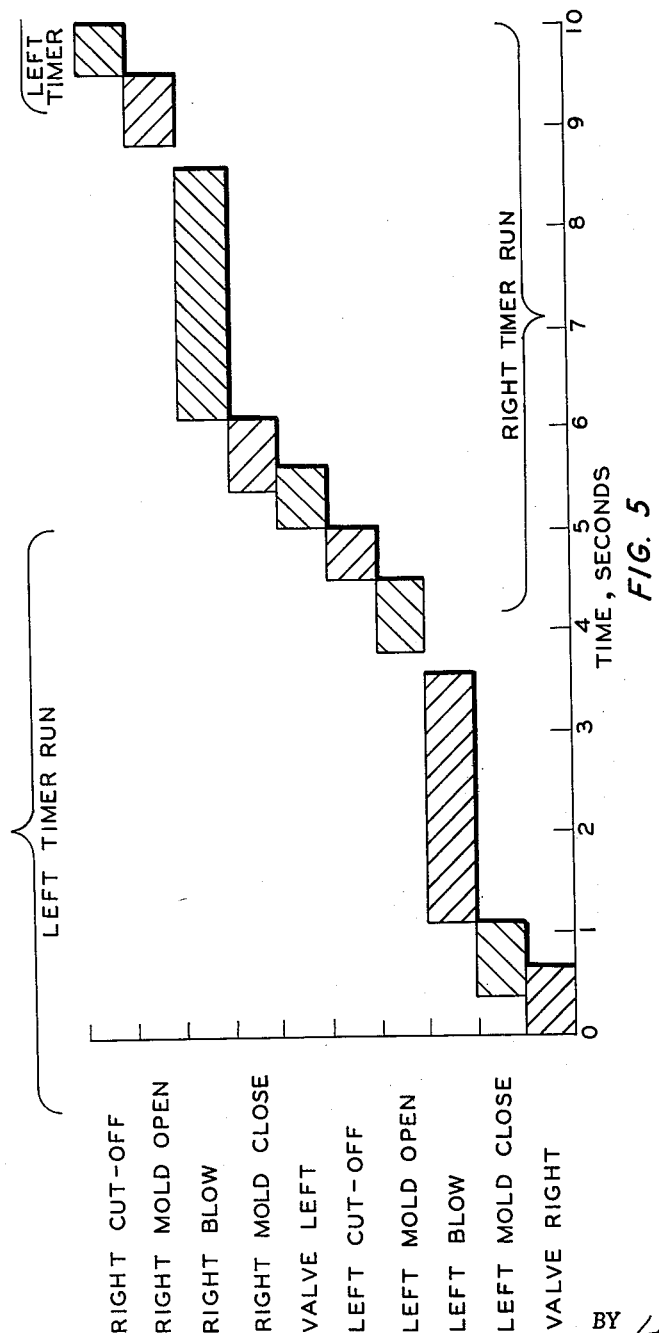

It is an object of my invention to provide apparatus suitable for extrusion blow molding of thermoplastic material. Another object is to provide apparatus which can be used to form hollow articles in a cyclic operation. Another object is to provide apparatus which utilizes a continuous alternate flow system to blow mold bottles in a cyclic operation, permitting the continuous operation of the plastics extruder. Still another object of my invention is to provide flexible machinery which can be readily adjusted to meet a variety of molding conditions and timing sequences in a molding cycle. Another object is to provide a small portable blow molding apparatus which can be used with a conventional plastics extruder. Other objects, advantages and features will be apparent to those skilled in the art from the following discussion and drawings in which FIGURE 1 is an isometric view of the molding and blowing apparatus,
FIGURE 2 is a schematic drawing of the air lines which operate the molding and blowing apparatus,
FIGURE 3 is a detail, partly in section, of the plug valve, die head and cut off knife,
FIGURE 4 illustrates a typical mold face,
FIGURE 5 is a graphical illustration of a complete molding cycle, and
FIGURES 6–10 are circuit drawings for the control apparatus.

The apparatus of the invention operates on the principle of a five-step molding cycle which is: (1) extrusion of the parison, (2) closing the mold halves on the extruded parison, (3) blowing the parison to conform to the shape of the mold, (4) opening the mold halves, and (5) cutting the molded item from the extrudate at the die face.

Two separate blowing and extrusion dies are used in order that steps 2–5 can be conducted at one die head while step 1 is being conducted at the other die head. Polymer melt is valved from one die head to another so that the flow of polymer from the extruder is substantially continuous.

Air under pressure provides the most convenient means of operating the molding equipment. The valves in the air lines are operated electrically and controlled automatically by the two timers in the control circuit. These timers establish the sequence and duration of the steps in the molding cycle.

As the articles are molded, they are cut from the extrudate at the die face and fall onto a conveyer and are carried to a receptacle outside the framework of the molding apparatus. As the articles are carried on the conveyer they are cooled by a stream of air from a blower.

The forming and blowing apparatus comprises two parison dies, which are tubing dies mounted for downward extrusion, positioned on each side of a three-way plug valve through which the die heads communicate with a central horizontal neck connected to a conventional extruder. Below each die are a pair of split molds mounted on platens which slide horizontally on V rails and a spring steel knife blade which severs the parison above the molded item at the die face. The details of this apparatus are shown in FIGURE 1.

Referring now to FIGURE 1 the molding apparatus is shown with the housing removed. All of the apparatus is supported by a box frame 20 made of angle iron. The frame also includes stanchions 21 and 22 which support cross bar 23. The parison die heads 24 and 26 are supported from the stanchions. Support members 27 and 28 support die head 24 from stanchion 21 and support members 29 and 30 support die head 26 from stanchion 22. Die heads 24 and 26 are connected by conduits 31 and 32 respectively to plug valve 33. Plug valve 33 is in turn connected to an extruder 34 through neck 36 supported by bar 37. Flange 38 on neck 36 fastens to the nozzle of the extruder which can be any conventional type of extrusion apparatus used in the plastics industry. The die heads and the plug valve will be described in greater detail in connection with FIGURE 3.

Plug valve 33 is motivated by air cylinder 39 which is connected through clevis 40 and arm 41 to the valve stem of the plug valve. Air cylinder 39 is pivotally mounted to support bar 42 by clevis 43.

As the polymer is forced from the extruder through the neck, plug valve, and conduits 31 and 32 into the die heads 24 and 26, the polymer is maintained in a fluid condition and at the desired temperature by electrical band heaters which encircle the neck, conduits and die heads. Neck 36 is heated by band heaters 44 which are controlled automatically in response to a temperature measurement within the neck made by thermocouple 46. Band heater 47 on conduit 31 and band heaters 48 on die head 24 are controlled in response to a temperature measurement made by thermocouple 49 imbedded in die head 24. In like manner band heater 50 on conduit 32 and heaters 51 on die head 26 are controlled in response to a temperature measurement made by thermocouple 52 imbedded in die head 26.

Air is supplied to die heads 24 and 26 for the blowing portion of the molding cycle by introducing the air under pressure through mandrels 56 and 54 respectively, the threaded ends of which are shown supported in the die heads by nuts 53 and 57.

Molten polymer which leaks from plug valve 33 can be removed through drain conduit 58.

Platform 59 supports air cylinder 60 which motivates platen 61. Mold half 62 is supported by platen 61 which rides on V rails 63. Opposite cylinder 60 is a similar air cylinder 64 which motivates a platen (not shown in this view) supporting mold half 66. The platen supporting mold half 66 also rides on V rails 63. Positioned below die head 26 is a similar assembly comprising platform 67 which supports air cylinder 68 and V rails 69. Air cylinder 68 motivates platen 70 which supports mold half 71 and rides on V rails 69. The opposing mold half 72 is supported in similar fashion by a platen (not shown) and motivated by an air cylinder 65 which is also supported by platform 67.

Platform 59 can be adjusted vertically by rotating hand wheels 73 and 74 on jack screws 76 and 77 respectively. Jack screws 76 and 77 are mounted in bearings in cross bars 78 and 79 respectively. In a similar fashion platform 67 can be adjusted in height by jack screw 80 which is mounted in cross bar 78 and another jack screw, not visible in this view but mounted in cross bar 79.

Associated with each die and mold assembly is a cut off knife. The knife associated with die head 24 is encased in sheath 81 and the knife associated with die head 26 is encased in sheath 82. These knives will be discussed in greater detail in connection with FIGURE 3.

Both platforms 59 and 67 have openings between the V rails and directly below the die heads so that when the molded articles are severed from the parisons the articles will fall through said openings into chute 83 positioned below and fastened to said platforms. Chute 83 carries side rails 84 and 86 and directs the molded items onto conveyer belt 87 which in turn conveys the articles to an external chute not shown. As the articles fall through chute 83 and travel along belt 87 they are cooled by air from blower 88. Belt 87 travels on drums 89 and 90 which are mounted on shafts that are journaled in bearings in support members 91 and 92 respectively. Support members 91 are mounted on vertical bars 93 and support members 92 are mounted on vertical bars 96. Conveyer belt 87 is driven by motor 97 on platform 98. Pulley 99 of motor 97 is linked to a pulley on the shaft of drum 90 by belt 100. The speed of motor 97 can be adjusted by turning a dial on the outside of the housing, which dial is connected to the motor by a flexible shaft.

Air is supplied from air manifold tanks 101 and 102 to the air cylinders of the apparatus and for blowing the molded items. The conduits and valves which link the manifold tanks to their respective pieces of equipment will be discussed in greater detail in connection with FIGURE 2. Tank 101 is equipped with a valved drain 103 and is supported by support members 104 and 106. Tank 102 is likewise equipped with a valved drain 107 and is fastened to vertical bars 93 by support members 108 and 109. Frame 20 is supported by four casters 110 which permit the assembly to be moved easily to and from the extruder.

Referring now to FIGURE 2 the conduits and valves which control the operation of the forming and molding apparatus are shown schematically. Air at substantially constant pressure is supplied to manifold tanks 101 and 102 through conduits 111 and 112, respectively, and conduit 113. An orifice 114 in line 113 is operatively connected to motor valve 116 through pressure recorder controller 117.

Cylinder 39 which operates the plug valve 33 is motivated by air supplied from tank 101 through conduit 118 and electrically operated valve 119. Air cylinder 39 is internally valved so that the closure of valve 119 vents one side of the air cylinder and directs the pressurized air to the other side. The momentary closure of valve 119, therefore, effects a reversal of the air cylinder 39 from its previous position. Air cylinders 60, 64, 68 and 65 operate in the same fashion. Air is supplied to air cylinders 60 and 64 which operate the mold halves under die head 24 from tank 101 through conduit 120 and valve 121. Air from line 120 passes through conduit 122 to cylinder 60 and through conduit 123 to cylinder 64. The speed with which cylinders 60 and 64 move can be regulated by adjusting valves 124 and 126 in lines 122 and 123, respectively. Valve 121 like valve 119 is activated electrically in the automatic control circuit.

Air for cylinders 68 and 65 is supplied from manifold 101 through conduit 127 and valve 128. Air passes from line 127 to cylinder 68 through line 129 and to cylinder 65 through line 130. The speed of the movement of the mold halves motivated by cylinders 65 and 68 can be regulated by adjusting valves 131 and 132 in lines 129 and 130 respectively. Valve 128 is also electrically activated.

Blowing air is supplied to die heads 24 and 26 through conduits 133 and 134 respectively which are connected to conduit 136 communicating with manifold 101. The air pressure used for blowing is registered by pressure gauge 137 and can be adjusted manually by valve 138. The blowing portion of the molding cycle is initiated by opening valve 139 in line 133 thereby supplying air to die head 24. When valve 139 closes it automatically vents die head 24 so that the pressure is relieved within the molded article. In like manner the blowing portion of the cycle for die head 26 is controlled electrically by the opening and closing of valve 140 in line 134.

After the molded item has been blown and the die halves opened the parison is severed at the die face by knives which are encased in sheaths 81 and 82. These knives are connected by rods to pistons in air cylinders 141 and 142, respectively. Air for the activation of the knife in sheath 81 is supplied from manifold 102 through conduit 143 to three-way valve 144 which is electrically motivated. Energizing a solenoid in valve 144 directs the air from line 143 through line 146 into air cylinder 141 and at the same time vents the opposite side of air cylinder 141 through conduit 147. When the solenoid is deenergized line 146 is vented and the air from line 143 is directed into conduit 147 thereby retracting the knife into its sheath. Air cylinder 142 operates in a similar fashion, air being supplied from manifold 102 through conduit 148 to three-way 149. Air is supplied from three-way valve 149 to opposite ends of air cylinder 142 through conduits 150 and 151.

Reference is now made to FIGURE 3 in which details of the plug valve, one parison die head and one cut off knife are shown in cross section. Referring first to the plug valve, valve 33 comprises a tapered plug 152 containing a right angle bore centrally located therein. The tapered plug carries a stem 153, to which the arm 41 of FIGURE 1 is linked, and a lower threaded extension 154. The tapered plug is positioned in a square valve body 156 which carries openings communicating with the channels in conduits 31 and 32 and neck 36 (not shown in this view). Valve stem 153 and plug extension 154 pass through brass bushings 157 and 158, respectively, in valve body 156. Valve body 156 carries a lining 159 of tungsten carbide and plug 152 is coated with a layer 160 of tungsten carbide. The use of tungsten carbide for lining the valve body and coating the valve plug is desirable in order to prevent galling. The conditions of operation of this plug are quite severe since the valve must rotate every few seconds while at an elevated temperature and also while maintaining a tight seal against leakage. No lubricant can be used which would contaminate the melt. A small amount of the molten polymer which leaks from the seal in the plug valve is permitted to drain through bleed holes 161 and 162. Any molten polymer thus passing from the plug valve is caught in drip box 163 and may be removed by drain 58. Plug 152 is held tightly in valve body 156 by coil spring 164 positioned between washers 166 and 167 thereby keeping plug extension 154 in tension. Adjusting nuts 168 and 169 can be moved on the threaded end of extension 154 to vary this tension.

As explained in connection with FIGURE 1 plug valve 33 is connected by conduit 32 to die head 26. Die head 26 comprises the body member 170 in which is imbedded the thermocouple 52. A right angle bore in the body member 170 communicates with the channel in conduit 32 and terminates in an orifice at the lower end of the die head. Mandrel 54 is positioned centrally in body member 170 and contains a central bore through which the blowing air passes. At the lower end of mandrel 54 is a changeable tip 171. Surrounding tip 171 and mounted in body member 170 is an adjustable bushing 172 which can be positioned by screws 173 in order to adjust the concentricity of the mandrel tip in the annular orifice. There are at least three such adjusting screws.

The interior contours of the die head should be streamlined so that there will be no stagnant zone in which polymer could degrade. Any minor defects which are introduced into the parison are greatly magnified when the parison is blown out to the shape of the mold. It is also important that the land length of the annular orifice be substantial in relation to the wall thickness of the parison. In the extrusion of parisons from polyethylene a land length to wall thickness ratio of at least 8 to 1 is desirable in order to obtain a smooth surface on the molded article.

Knife 174 is encased in its sheath 82 and aligned with the lower face of the die head. Knife 174 is connected by a rod 176 to a piston 177 in air cylinder 142 which is mounted in the lower end of sheath 82. Knife 174 is made of spring steel and turns a 90 degree corner when motivated. The cut off knives thus permit a savings in space requirement and the flexing of the blade as it operates keeps the blade free from accumulations of polymer. While the embodiment of FIGURE 3 is preferred it is also possible to construct the knife blade in a horizontal plane for operation with a direct action without the flexing as described above.

A typical design for mold half 71 is shown in FIGURE 4. The mold is designed for fabrication of a bottle and has a body portion 178, a neck portion 179, and a pinch-off 180. The preferred material of construction of the mold is aluminum. The molds should be adjusted to within 0.002 to 0.004 inch of the die face in order to confine the parison during the blowing cycle and prevent polymer from blowing out between the mold and the die. Perfect mold closure and alignment of the mold cavities is very important as misalignment or poor closure will result in thinning of the polymer along the mold parting lines. The mold halves are provided with internal channels for the circulation of cooling water and the number and lengths of the channels will be determined by the size of the article being molded. Where the molded part is thickest more heat must be removed and hence more cooling surface is required. Particular attention should be given to the neck and pinch off areas of the mold. In the design of the mold sharp angles should be avoided and corners should be reduced as much as possible to minimize thinning or stresses. The large radius in the chime area of the bottle shown in FIGURE 4 helps to avoid stress cracking which tends to occur in the transition areas between the thick pinched section of the bottle and the much thinner corner. The bottom of the bottle is concave to insure that it will rest flat. When the mold halves are closed a gap of about 0.006 inch at the pinch off area is satisfactory and it is desirable to flatten the lower or tail portion of the parison by forming the bottom portion 181 of the mold so that the distance between the mold halves when closed is only about twice the thickness of the parison wall.

A typical molding cycle is shown graphically in FIGURE 5. The bars on the graph correspond to the timer contact settings. The lengths of the timer runs are shown by the brackets at the top (left timer) and bottom (right timer) of the graph. For example, in a complete molding cycle of 10 seconds, each timer is set to operate for about 5.75 seconds. About 0.7 second after the left timer begins to run the contacts in the circuit operating the plug valve close and remain closed for about 0.6 second. This causes the plug valve to divert the polymer inlet to the right die. About 1.2 seconds after the timer begins the contacts in the circuit operating the mold cylinders close and remain closed for about 0.6 second. Then the contacts in the blowing circuit close for about 2.5 seconds and 0.2 second later the left-mold-open contacts close for about 0.6 second. This gap between the blowing and mold-open portions of the molding cycle permits the pressurized air in the molded article to exhaust, thus preventing deformation of the article after the mold halves are retracted.

About 0.3 second after the left-mold-open contacts close, contacts in the left timer close to start the operation of the right timer. Contacts on the left timer operating the left knife then close for about 0.5 second and after these contacts open the left timer shuts off and returns to starting position. Meanwhile the right timer continues through a similar sequence, restarting the left timer before completing its own run.

Figure 6:
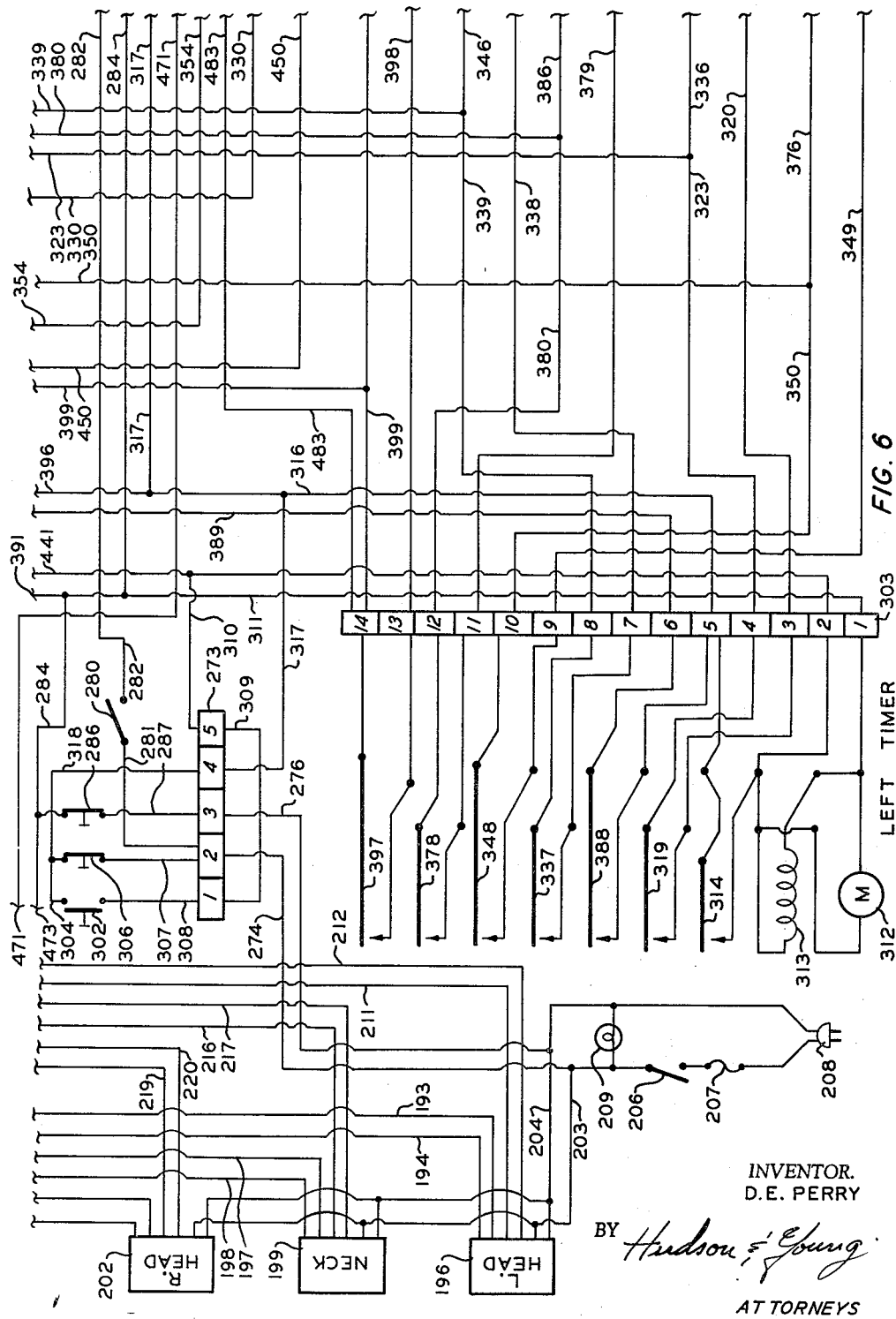
Figure 7:
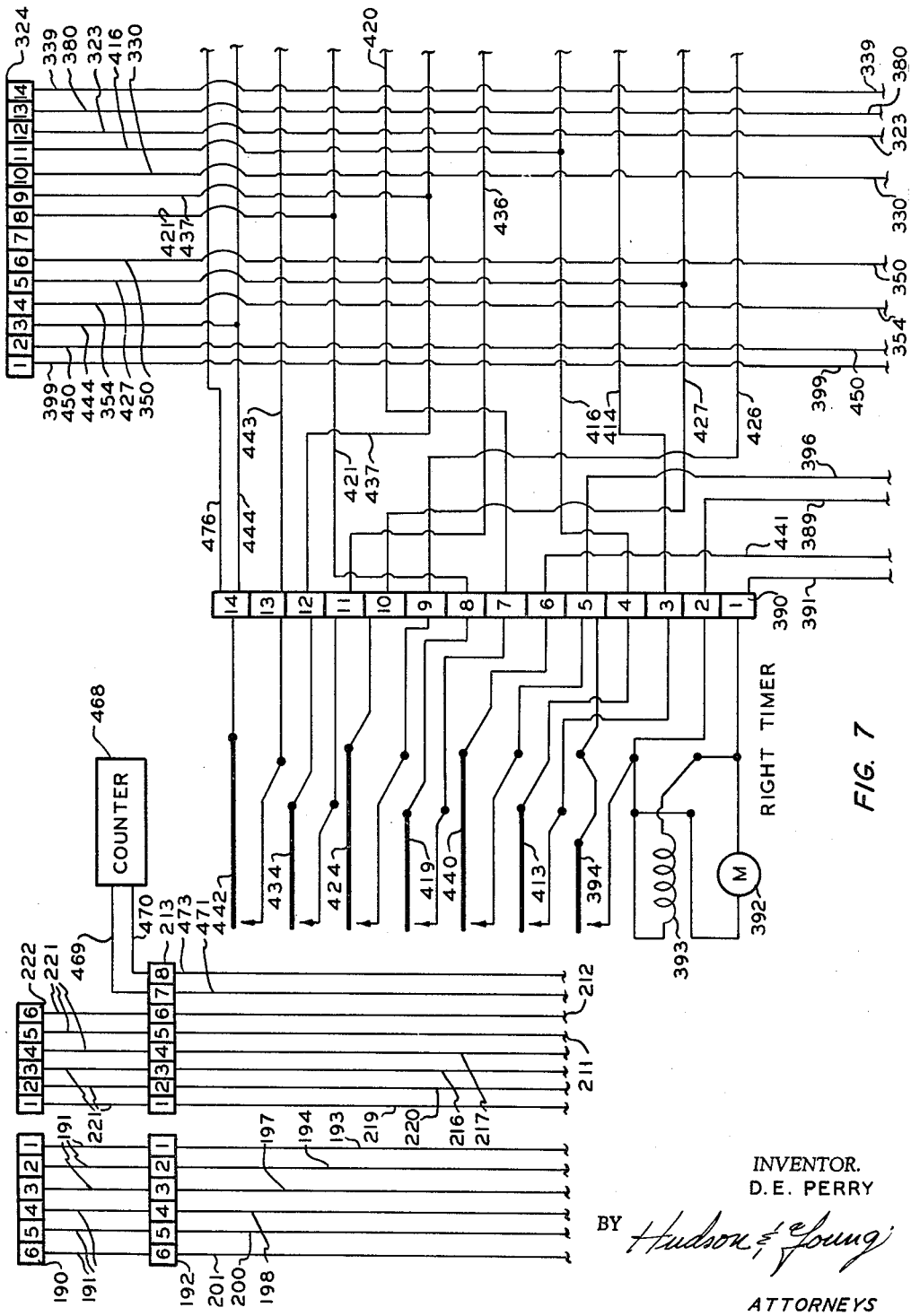
Figure 8:
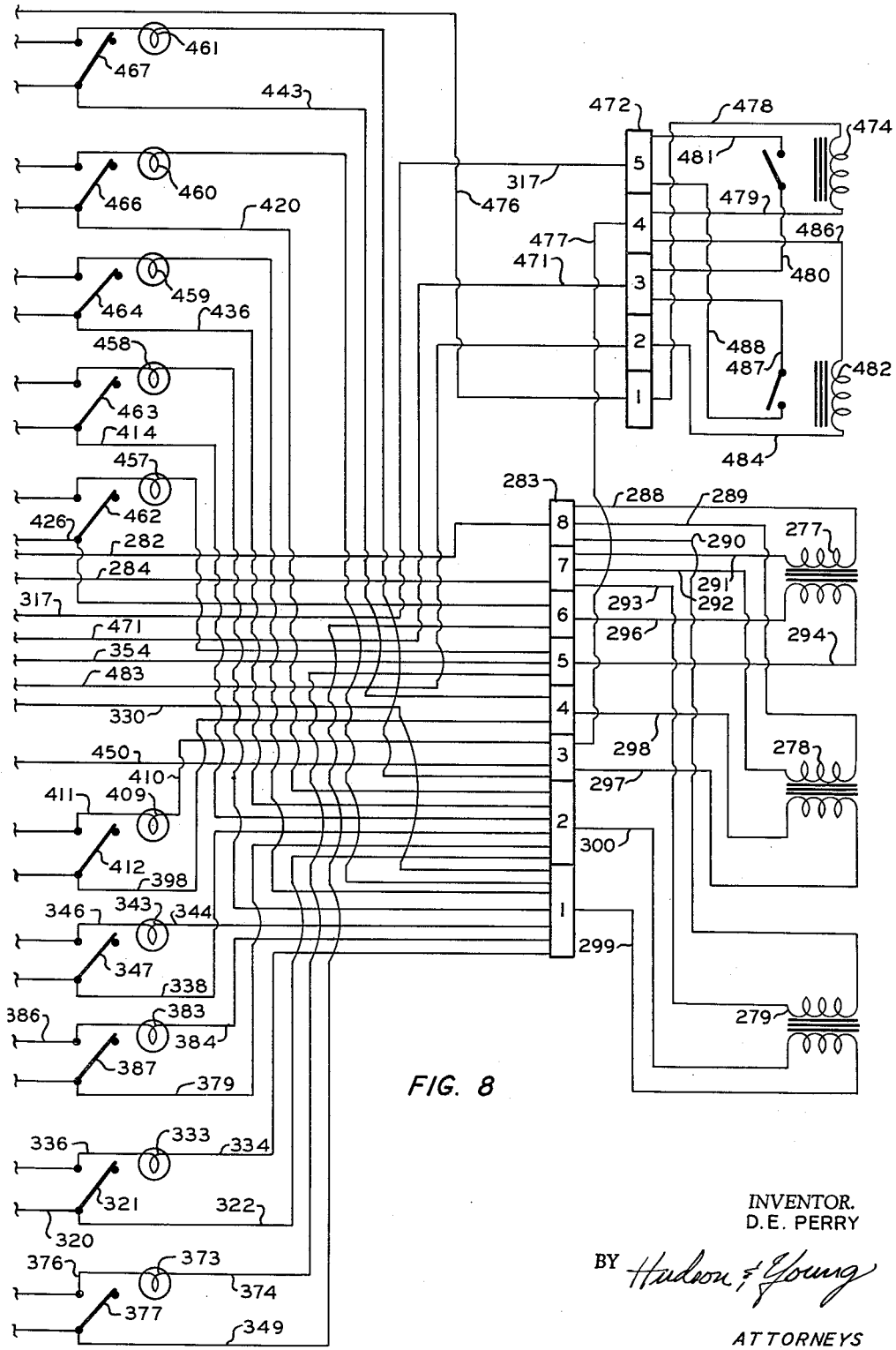
Figure 9:
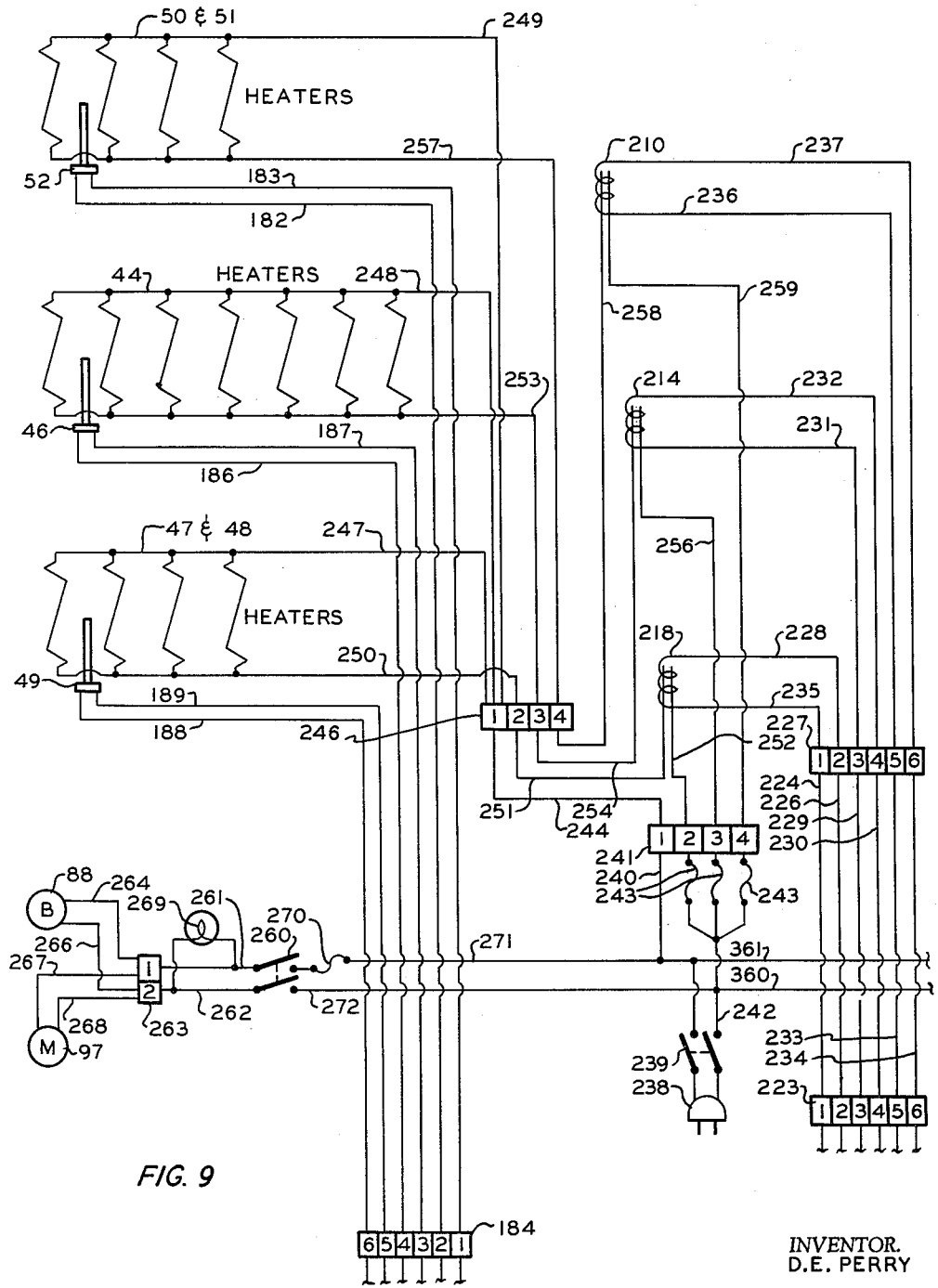
Figure 10:
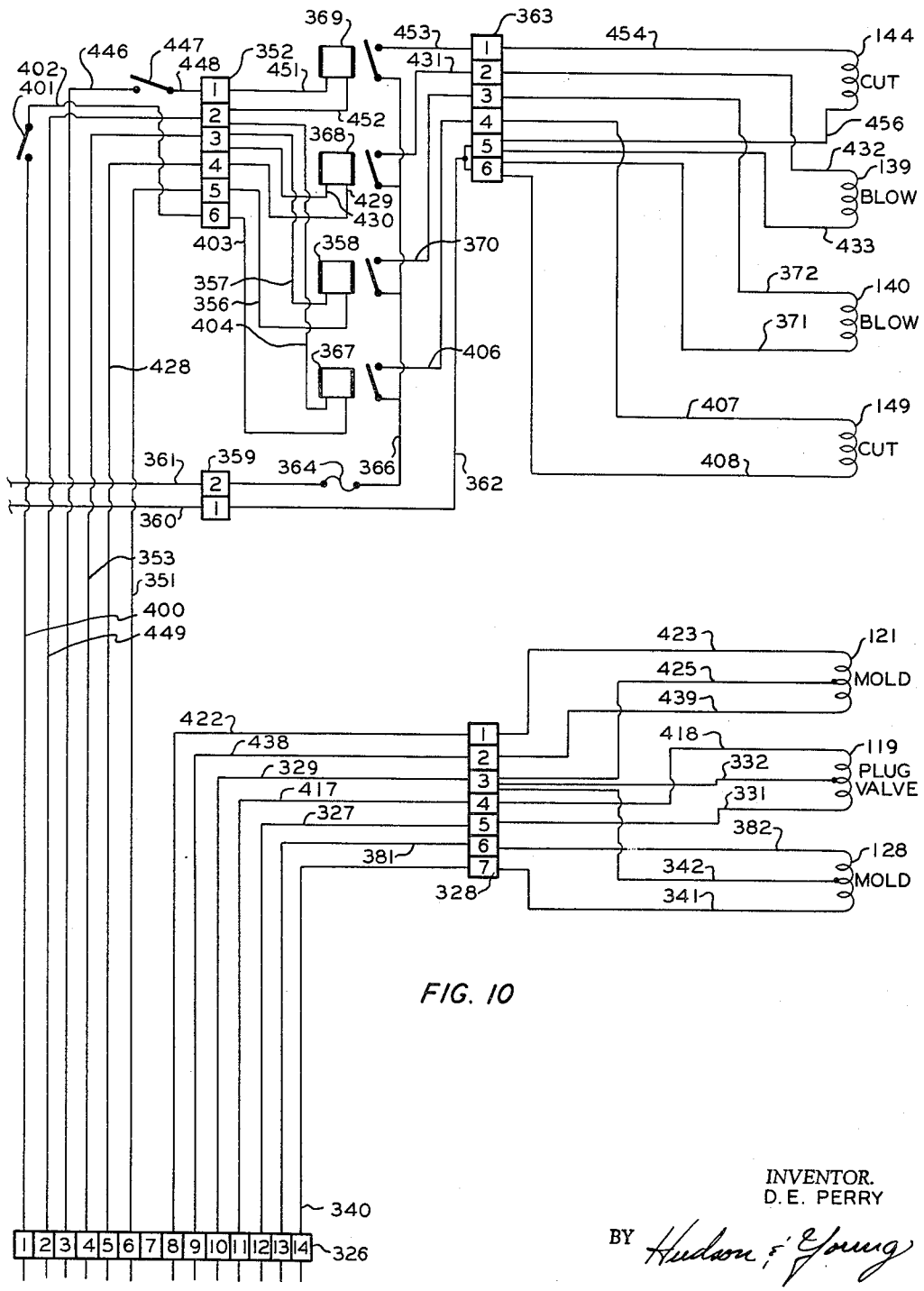

The control circuitry for the automatic molding cycle is shown in FIGURES 6–10. Most conveniently the circuits and equipment of FIGURES 6–8 are housed in a separate control console while the equipment of FIGURES 9 and 10 is placed in the housing with the forming and blowing mechanism. Connections between the two circuits are made by joining the six pin male plugs 184 and 223 of FIGURE 9 with the six pin female plugs 190 and 222, respectively, of FIGURE 7, and the 14 pin male plug 326 of FIGURE 10 with the 14 pin female plug 324 of FIGURE 7.

As previously described, the neck of the forming machine which attaches to an extruder and the two molding heads are provided with band heaters. Thermocouples in said neck and heads are connected to temperature controllers which control the current to said band heaters to maintain the molten polymer at proper temperature. This control circuit is shown in FIGURES 6, 7 and 9; FIGURE 9 showing the heaters, thermocouples and connector to a 230 v. A.C. source, FIGURE 6 showing the temperature controllers and connector to a 115 v. A.C. source, and FIGURE 7 showing the connecting circuit.

Referring now to FIGURE 9 thermocouple 52 which is imbedded in die head 26 is connected by leads 182 and 183 to terminals 1 and 2 of the 6-pin male plug 184. In similar fashion thermocouple 46 in neck 36 is connected by leads 186 and 187 to terminals 3 and 4 of plug 184. Thermocouple 49 imbedded in die head 24 is connected by leads 188 and 189 to terminals 5 and 6 of plug 184.

As stated above plug 184 is connected to 6-pin plug 190 of FIGURE 7. The terminals of plug 190 are respectively connected by conductors 191 to terminal block 192. Conductors 191 represent a flexible cable which is used between the control console and the molding apparatus. Leads 193 and 194 which are connected to terminals 1 and 2 of terminal block 192 are connected as shown in FIGURE 6 to temperature controller 196. Temperature controller 196 is thus connected to the thermocouple 52. In similar fashion leads 197 and 198 which are connected to terminals 3 and 4 of terminal block 192 are connected to temperature controller 199. Leads 200 and 201 connect terminals 5 and 6 to temperature controller 202.

Temperature controllers 196, 199 and 202 receive power from a 115 v. A.C. source through conductors 203 and 204. Conductor 203 is connected to switch 206 which in turn is connected through fuse 207 to plug 208. Conductor 204 is connected directly to plug 208. Signal light 209 across conductors 203 and 204 indicates when switch 206 is closed.

Responsive to a signal received from thermocouple 52 controller 196 activates a relay 210 in FIGURE 9. Controller 196 is connected to relay 210 through leads 211 and 212 (FIGURES 6 and 7) which connect to terminals 5 and 6 of 8-contact terminal block 213 in FIGURE 7. In similar fashion controller 199 in response to a signal from thermocouple 46 activates relay 214 in FIGURE 9. Leads 216 and 217 connect controller 199 to terminals 3 and 4 of block 213. Temperature controller 202 in response to a signal from thermocouple 49 activates relay 218. Controller 202 is connected through leads 219 and 220 to terminals 1 and 2 of block 213. Terminals 1–6 of block 213 are connected by leads 221 to 6-pin plug 222. Leads 221 form a cable which is used to make the connection between the control console and the molding apparatus.

As explained above, plug 222 is connected to 6-pin male plug 223 in FIGURE 9. Conductors 224 and 226 connect pins 1 and 2 of plug 223 to terminals 1 and 2 of block 227. Relay 218 is connected to terminals 1 and 2 of block 227 by leads 228 and 235. In like fashion pins 3 and 4 of block 223 are connected by leads 229 and 230 to terminals 3 and 4 of block 227 which are in turn connected to relay 214 by leads 231 and 232. Pins 5 and 6 of plug 223 are connected by leads 233 and 234 to terminals 5 and 6 of block 227 which are in turn connected to relay 210 by leads 236 and 237.

Current for the operation of the heaters 44 on neck 36 and heaters 47 and 48 on conduit 31 and die head 24 and heaters 50 and 51 on conduit 32 and die head 26 is supplied from a 230 v. A.C. source into which plug 238 is connected. Plug 238 is connected to switch 239. One side of switch 239 is connected through lead 240 to terminal 1 of block 241. The other side of switch 239 is connected by lead 242 and through fuses 243 to terminals 2, 3 and 4 of block 241. Terminal 1 of block 241 is connected by lead 244 to terminal 1 of block 246. Terminal 1 of block 246 is connected by lead 247 to heaters 47 and 48, by lead 248 to heater 44 and by lead 249 to heaters 50 and 51. The other side of heaters 47 and 48 is connected by lead 250 to terminal 2 of block 246 which is connected by leads 251 and 252 through relay 218 to terminal 2 of block 241. Heater 44 is connected by lead 253 to terminal 3 of block 246 which in turn is connected by leads 254 and 256 through relay 214 to terminal 3 of block 241. Heaters 50 and 51 are connected by lead 257 to terminal 4 of block 246 which in turn is connected by leads 258 and 259 through relay 210 to terminal 4 of block 241.

Activation of relay 210 by controller 196 in response to a signal from thermocouple 52 completes the circuit between the source of 230 v. A.C. and the heaters 50 and 51. Activation of relay 214 by controller 199 completes the circuit energizing heaters 44. Heaters 47 and 48 receive current when relay 218 is closed in response to a signal from controller 202 which is connected to thermocouple 49.

Blower 88 and motor 97 which drives the conveyer belt in the molding apparatus are operated on 230 v. A.C. which is supplied from the source into which plug 238 is connected. The blower and motor are started by closing switch 260 which is connected by leads 261 and 262 to terminals 1 and 2 of block 263. Blower 88 is connected to terminals 1 and 2 by leads 264 and 266. Motor 97 is connected to terminals 1 and 2 of block 263 by leads 267 and 268. Signal light 269 connected to leads 261 and 262 indicates when switch 260 is closed. One pole of switch 260 is connected through fuse 270 and lead 271 to lead 240. The other pole of switch 260 is connected by lead 272 to lead 242.

The cycle control circuit shown in FIGURES 6, 7, 8 and 10 controls the sequential operation of the main plug valve, the air cylinders which open and close the molds, the blowing air and the knives which sever the molded bottles from the polymer in the nozzles. The timing of the cycle is controlled by left and right timers shown in FIGURES 6 and 7 respectively. These timers can suitably be Multiflex Reset Timers manufactured by Eagle Signal Corporation.

The setting of the contacts on the timers determines the length of the timer run and the sequence in which the several steps in the molding operation occur. Each timer has seven sets of contacts. One set of contacts in each timer controls the duration of the timer run and one set in each timer starts the other timer. The remaining five sets of contacts are wired in 8 v. A.C. circuits with relays or solenoids operating air valves for the five steps of the molding cycle. These relays and solenoid air valves are shown in FIGURE 10. The 8 v. A.C. is supplied by three transformers 277, 278 and 279 shown in FIGURE 8. One large transformer can be used if desired.

A manually operated, normally open, micro switch with a signal light is wired in each 8 v. A.C. circuit. These switches can be used to operate the molding equipment in any part of the cycle independently of the timers. The signal lights are wired in parallel to the solenoids and indicate the intervals during which their respective timer contacts are closed.

The timer circuits will be discussed in detail in connection with one complete molding cycle. Referring first to FIGURE 6, 115 v. A.C. is supplied to terminals 2 and 3 of block 273 by leads 275 and 276 which are connected to leads 203 and 204. Referring to FIGURE 8, transformers 277, 278 and 279 are energized by closing switch 280 of FIGURE 6. Switch 280 is connected by lead 281 to terminal 2 of block 273 and by lead 282 to terminal 8 of transformer block 283, FIGURE 8. Terminal 7 of block 283 is connected by lead 284 to a terminal of emergency stop switch 286. The other terminal of stop switch 286 is connected by lead 287 to terminal 3 of block 273. Transformers 277, 278 and 279 are all connected to terminals 7 and 8 of block 283. Terminal 8 is connected by leads 288, 289 and 290 to transformers 277, 278 and 279, respectively. Terminal 7 is connected by leads 291, 292 and 293 to transformers 277, 278 and 279, respectively. After transformer 277 is energized 8 v. A.C. is supplied to terminals 5 and 6 of block 283 by leads 294 and 296. Transformer 278 supplies 8 v. A.C. to terminals 3 and 4 of block 283 through leads 297 and 298. Transformer 279 supplies 8 v. A.C. to terminals 1 and 2 of block 283 through leads 299 and 300.

The automatic operation of the control system is begun by starting the left timer (FIGURE 6). This is done by momentarily closing push button switch 302 which applies 115 v. A.C. across terminals 1 and 2 of terminal block 303. One pin of switch 302 is connected by lead 304 to one side of emergency stop switch 306. Stop switch 306 is connected by lead 307 to terminal 2 of block 273. The other side of switch 302 is connected by lead 308 to terminal 1 of block 273 and jumper 309 connects terminal 5 to terminal 1. Terminal 5 of block 273 is connected by lead 310 to terminal 2 of block 303. Terminal 1 of block 303 is connected by lead 311 which connects to lead 284 connected through switch 286 to terminal 3 of block 273.

Motor 312 and clutch coil 313 of timer 301 are connected in parallel to terminals 1 and 2 of block 303. When switch 302 is closed motor 312 is started and the clutch is engaged beginning operation of the left timer and immediately closing contacts 314. Contacts 314 are set to close immediately when the left timer is started and are set to open at the end of the timer run. Switch 302 is then allowed to open and 115 v. A.C. continues to be applied across the motor and clutch coil of timer 301 through contacts 314 which are connected to terminal 5 of block 303 which in turn is connected by leads 316 and 317 to terminal 4 of block 273. Terminal 4 is connected by lead 318 to switch 306, by-passing start switch 302.

Within about 0.7 second after the left timer starts operation contacts 319 close and remain closed for about 0.6 second. Contacts 319 are connected to terminals 3 and 4 of block 303. Terminal 3 of block 303 is connected by lead 320 to manual switch 321, FIGURE 8. The same pole of switch 321 is connected by lead 322 to terminal 2 of block 283. Terminal 4 of block 303 is connected by lead 323 to terminal 12 of 14-pin plug 324, FIGURE 7. Plug 324 is connected to plug 326 of FIGURE 10 and pin 12 of plug 326 is connected by lead 327 to terminal 5 of block 328. Terminal 3 of block 328 is connected by lead 329 to pin 10 of plug 326 and pin 10 of plug 324 is connected by lead 330 to terminal 1 of transformer block 283. Thus when contacts 319 close 8 v. A.C. is picked up from the secondary side of transformer 279 and applied across terminals 3 and 5 of block 328 in FIGURE 10 energizing the coil of valve 119 which is connected to terminal 5 by lead 331 and to terminal 3 by lead 332. Energizing the coil of valve 119 activates air cylinder 39 causing plug valve 33 to be moved in position to direct the polymer melt to the right die head 24.

Signal light 333 is connected by conduits 334 and 336 in parallel to valve 119. The circuit can also be closed by manual switch 321 connected between leads 320 and 336.

About 1.2 seconds after the left timer begins operation contacts 337 close and remain closed for about 0.6 second. Contacts 337 are connected to terminals 7 and 8 of block 303. Terminal 7 is connected by lead 338 to terminal 2 of transformer block 283. Terminal 8 of block 303 is connected by lead 339 to pin 14 of plug 324, FIGURE 7. Pin 14 of plug 326 is connected by lead 340 to terminal 7 of block 328. Thus when contacts 377 close 8 v. A.C. is applied across terminals 3 and 7 of block 328. The coil of valve 128 is connected by lead 341 to terminal 7 and by lead 342 to terminal 3 of block 328. Energizing this coil closes valve 128 momentarily which in turn causes air cylinders 68 and 65 to close mold halves 71 and 72. Signal light 343 is connected by leads 344 and 346 in parallel to the coil of valve 128. Manual switch 347 can be used to close the circuit, this switch being connected across leads 338 and 346.

After the molds have closed and in a typical cycle immediately after contacts 337 open, contacts 348 close and remain closed for the blowing period, e.g., about 2.5 seconds. Contacts 348 are connected to terminals 9 and 10 of block 303. Terminal 9 is connected by lead 349 to terminal 6 of block 283. Terminal 10 of block 303 is connected by lead 350 to pin 6 of plug 324. Pin 6 of plug 326, FIGURE 10, is connected by lead 351 to terminal 5 of terminal block 352. Terminal 3 of block 352 is connected by lead 353 to pin 4 of plug 326 and pin 4 of plug 324 is connected by lead 354 to terminal 5 of transformer block 283. Transformer 277 applies 8 v. A.C. across terminals 5 and 6 of block 283 which is applied in turn across terminals 5 and 3 of block 352 when contacts 348 close. Terminals 5 and 3 of the block 352 are connected by leads 356 and 357 to relay 358.

A 230 v. A.C. is supplied to terminals 1 and 2 of block 359 by leads 360 and 361 which are connected to conduits 242 and 240 respectively, FIGURE 9. Terminal 1 of block 359 is connected by lead 362 to terminals 5 and 6 of block 363. Terminal 2 of block 359 is connected through fuse 364 by lead 366 to relays 367, 358, 368 and 369. When 8 v. A.C. is applied across terminals 5 and 3 of block 352 relay 358 closes and applies 230 v. A.C. across terminals 3 and 6 of block 363, relay 358 being connected to terminal 3 in block 363 by lead 370. The coil of valve 140 is connected by leads 371 and 372 to terminals 6 and 3 of block 363. When the coil of valve 140 is energized valve 140 opens to admit pressurized air to the mandrel of die 26 thus blowing the parison between die halves 71 and 72. When contacts 348 open deenergizing relay 358 and the coil of valve 140, valve 140 returns to a normally closed position which vents the mandrel and molded article of die 26.

Referring to FIGURE 8 signal light 373 is connected by lead 374 and lead 376 in parallel to relay 358, indicating the duration of the blowing cycle. Manual switch 377 can be used to close this circuit.

About 0.2 second after contacts 348 open, allowing sufficient time to vent the molded article, contacts 378 close to open mold halves 71 and 72. Contacts 378 are connected to terminals 11 and 12 of block 303. Terminal 11 is connected by lead 379 to terminal 2 of transformer block 283. Terminal 12 of block 303 is connected by lead 380 to pin 13 of plug 324. Pin 13 of plug 326, FIGURE 10, is connected by lead 381 to terminal 6 of block 328. Thus when contacts 378 close, 8 v. A.C. is applied across terminals 3 and 6 of block 328 energizing the coil of valve 128 which is connected to terminal 3 by lead 342 and to terminal 6 by lead 382. Momentarily closing valve 128 reverses air cylinders 65 and 68 causing them to open mold halves 72 and 71. Signal light 383 in FIGURE 8 is connected by leads 384 and 386 in parallel to the coil of valve 128 and indicates the operation of this part of the molding cycle. The mold can also be opened manually by operating switch 387 connected across leads 379 and 386.

Shortly after contacts 378 close, contacts 388 also close momentarily in order to start the operation of the right timer. Contacts 388 are connected to terminals 5 and 6 of block 303. As discussed above terminal 5 is connected by leads 316 and 317 to terminal 4 of block 273 which is connected to one side of a 115 v. A.C. source. Terminal 6 of block 303 is connected by lead 389 to terminal 2 of block 390 in the right timer, FIGURE 7. Terminal 1 of block 390 is connected by lead 391 to lead 284 which connects through emergency stop button 386 to terminal 3 of block 273. Thus when contacts 388 close 115 v. A.C. is applied across terminals 1 and 2 of block 390 in the right timer which starts the operation of motor 392 and energizes clutch coil 393 which are connected in parallel across terminals 1 and 2. Starting the operation of the right timer closes contacts 394 which determine the length of the right timer run. Once contacts 394 are closed the circuit is completed between terminals 1 and 5 of block 390, terminal 5 of block 390 being connected by lead 396 to lead 317.

After the operation of the right timer has begun contacts 397 of the left timer close for about 0.5 second. Contacts 397 are connected to terminals 13 and 14 of block 303, terminal 13 being connected by lead 398 to terminal 4 of transformer block 283. Terminal 3 of block 283 is connected by lead 450 to pin 2 of plug 324 and pin 2 of plug 326, FIGURE 10, is connected by lead 449 to terminal 2 of block 352. Terminal 14 of block 303 is connected by lead 399 to pin 1 of plug 324. Pin 1 of plug 326 is connected by lead 400 to limit switch 401 which is in turn connected by lead 402 to terminal 6 of relay block 352. Limit switch 401 is a normally open switch positioned in the path of one of said mold halves 71 or 72 so that the switch is closed only when the molds are in an open position. When switch 401 and contacts 397 are closed 8 v. A.C. is applied across terminals 6 and 2 of block 352 thereby energizing relay 367 which is connected to terminal 6 by lead 403 and to terminal 2 by lead 404. When relay 367 is energized 230 v. A.C. is applied across terminals 4 and 6 of block 363, terminal 4 being connected to relay 367 by lead 406. The coil of valve 149 in the air line to the air cylinder 142 which motivates the cutting knife for die 26 is connected to terminals 4 and 6 of block 363 by leads 407 and 408. Thus when contacts 397 are closed valve 149 is positioned to direct air into the lower portion of air cylinder 142 which causes the knife in sheath 82 to eject and cut the parison at the die face. When contacts 397 open valve 149 returns to its normal position which directs air to the upper portion of cylinder 142 causing the knife blade to retract and remain retracted. Signal light 409 is connected by leads 410 and 411 in parallel with relay 367 thereby indicating its operation. Manual switch 412 can be used to close this circuit.

Immediately after contacts 397 open contacts 314 also open thereby completing the run of the left timer. The clutch of the left timer is disengaged and the contact carrier returns to starting position. Simultaneously with the opening of contacts 397 in the left timer contacts 413 in the right timer close.

Contacts 413 are connected to terminals 3 and 4 of right timer block 390, terminal 3 being connected by lead 414 to terminal 2 of transformer block 283 and terminal 4 being connected by lead 416 to pin 11 of plug 324. Pin 11 of plug 326 is connected by lead 417 to terminal 4 of block 328. Since the coil of plug valve 119 is connected by lead 418 to terminal 4, closing contacts 413 closes valve 119 causing air cylinder 39 to reverse position and direct the polymer melt to the left die head 26.

While the left timer has been running through its molding cycle a parison has been extruded from right die 24 so that mold halves 62 and 66 can now be closed. This is effected by the closing of contacts 419 in the right timer. Contacts 419 are connected to terminals 7 and 8 of block 390, terminal 7 being connected by lead 420 to terminal 2 of transformer block 283 and terminal 8 being connected by lead 421 to pin 8 of plug 324. Pin 8 of plug 326 is connected by lead 422 to terminal 1 of block 328, FIGURE 10. Since the coil of valve 121 is connected by lead 423 to terminal 1 of block 328 and by lead 425 to terminal 3 of block 328, the closing of contacts 419 energizes valve 121 causing it to close and reverse air cylinder 60 and 64 which then close the mold halves 62 and 66.

After the mold halves have closed contacts 424 close for the duration of the blowing cycle. Contacts 424 are connected to terminals 9 and 10 of block 390, terminal 9 being connected by lead 426 to terminal 6 of transformer block 283 and terminal 10 of block 390 being connected by lead 427 to pin 5 of plug 324. Pin 5 of plug 326 is connected by lead 428 to terminal 4 of block 352. The closing of contacts 424 applies 8 v. A.C. across terminals 4 and 3 of block 352 thereby energizing relay 368 which is connected to terminals 4 and 3 by leads 429 and 430. Relay 368 is connected to terminal 2 of block 363 by lead 431. Closing relay 368 applies 230 v. A.C. across contacts 2 and 5 of block 363 thereby energizing the coil of valve 139 which is connected to terminals 2 and 5 by leads 432 and 433. Valve 139 controls the blowing air to die head 24.

Shortly after the blowing cycle is completed and contacts 424 open, allowing time for the pressure to reduce in the molded item, contacts 434 close momentarily in order to open the right molds. Contacts 434 are connected to terminals 11 and 12 of block 390, terminal 11 being connected by lead 436 to terminal 2 of transformer block 283. Terminal 12 is connected by lead 437 to pin 9 of plug 324. Pin 9 of plug 326 is connected by lead 438 to terminal 2 of block 328. The coil of valve 121 is connected by lead 439 to terminal 2 of block 328 and to terminal 3 by lead 425 so that closing contacts 434 energizes the coil of valve 121 reversing cylinders 60 and 64 and opening mold halves 62 and 66.

Shortly after contacts 434 close, contacts 440 close to restart the operation of the left timer. Contacts 440 are connected to terminals 5 and 6 of block 390. Terminal 5 as previously described is connected by lead 396 and lead 317 to terminal 4 of block 273 which in turn is connected to one side of a 115 v. A.C. supply through emergency stop switch 306. Terminal 6 of block 390 is connected by lead 441 to lead 310 which is connected to terminal 2 of block 303 in the left timer. Since terminal 1 of block 303 is connected through leads 311 and 284 and emergency switch 286 to the other side of the 115 v. A.C. supply, the closing of contacts 440 completes the circuit applying 115 v. A.C. across terminals 1 and 2 of block 303 thereby starting motor 312 and energizing clutch coil 313 of the left timer. By the time contacts 440 open, contacts 314 of the left timer have closed to complete the circuit as previously described.

After the mold halves for the right die have opened contacts 442 close to operate the right cut off knife. Contacts 442 are connected to terminals 13 and 14 of block 390, terminal 13 being connected by lead 443 to terminal 4 of transformer block 283 and terminal 14 being connected by lead 444 to pin 3 of plug 324. Pin 3 of plug 326 is connected by lead 446 to limit switch 447 which operates in the same fashion as described in connection with switch 401, being normally open but closed when the right mold halves 62 and 66 are retracted. Switch 447 is connected by lead 448 to terminal 1 of block 352. Terminal 2 of block 352 is connected by lead 449 to pin 2 of plug 326 and pin 2 of plug 324 is connected by lead 450 to terminal 3 of transformer block 283. Thus the closing of contacts 442 applies 8 v. A.C. across terminals 1 and 2 of block 352 energizing relay 369 which is connected to terminals 1 and 2 by leads 451 and 452. Relay 369 is connected by lead 453 to terminal 1 of block 363 so that the closing of relay 369 applies 230 v. A.C. across terminals 5 and 1 of block 363. The coil of valve 144 is connected by leads 454 and 456 to terminals 1 and 5 of block 363. When the coil of valve 144 is energized with 230 v. A.C. air cylinder 141 and the cutoff knife in sheath 81 are activated as described in connection with the knife in sheath 82.

Similarly as described in connection with the circuit for the left timer, circuits in the right timer are provided with signal lights 547, 458, 459, 460 and 461 which indicate the operation of their corresponding set of timer contacts. The timer switches can be bypassed by using manually operated switches 462, 463, 464, 466 and 467 disposed in the circuits in the same fashion as described in connection with the left timer.

A count of the articles produced by the molding apparatus is kept by a counter 468 shown in FIGURE 7. Counter 468 is connected by leads 469 and 470 to terminals 7 and 8 of block 213. Terminal 7 is connected by lead 471 to terminal 3 of block 472 in FIGURE 8. Terminal 8 of block 213 is connected by lead 473 to lead 284 which in turn connects through switch 286 and lead 287 to terminal 3 of block 273 connected to one side of a 115 v. A.C. supply. The other side of the 115 v. A.C. is supplied to terminal 5 of block 472 from terminal 4 of block 273 through lead 317. Relay 474 is energized with 8 v. A.C. by the closing of contacts 442 in the right timer. Terminal 14 of block 390 is connected by lead 476 to terminal 1 of block 472. Terminal 4 of block 472 is connected by lead 477 to terminal 3 of transformer block 283. The 115 v. A.C. switch of relay 474 is connected to terminals 3 and 5 by leads 480 and 481. Since relay 474 is connected to terminals 1 and 4 of block 472 by leads 478 and 479, the closing of contacts 442 applies 8 v. A.C. across relay 474, closing its switch and completing the circuit between terminals 3 and 5 thereby activating the counter.

The closing of contacts 397 in the left timer applies 8 v. A.C. across relay 482 activating counter 468 in the same manner as above. Terminal 14 of block 303 is connected by lead 483 to terminal 2 of block 472. The coil of relay 482 is connected to terminals 2 and 4 of block 472 by leads 484 and 486 and the switch is connected to terminals 3 and 5 by leads 487 and 488.

The apparatus of my invention can be used to form a variety of hollow articles other than bottles, such as toys, floats, decorative items, and the like. In addition to olefin polymers such as polyethylene, polypropylene and copolymers of ethylene with higher olefins such as propylene or 1-butene, other thermoplastics such as polyvinyl chloride, polystyrene and the like can be fabricated with the apparatus of my invention.

When forming articles from linear polyethylene typical molding conditions are as follows: The time of each molding cycle can be varied considerably, 4 seconds to 10 seconds being reasonable, depending upon the size and thickness of the molded item. The temperature of the polymer melt at the die heads can be about 400° F. In general, as the polymer temperature is increased, the surface smoothness and gloss are improved, less blow pressure is required, a longer cycle time is required and the molded item tends to shrink less. Also, the expansion or "swell" of the parison as it extrudes from the die orifice is decreased. The temperature of the molds can suitably be about 40° F. and generally lowering the mold temperature decreases the cycle time and the shrinkage but requires more blow pressure for good articles. A blow pressure of 60 to 80 p.s.i.g. is satisfactory when molding, for example, a four ounce bottle having a 20 mil wall thickness. In general, higher blow pressures are needed with thinner walled items.

It should be appreciated that the apparatus of my invention permits the above-mentioned variables to be readily adjusted in order to arrive at the best molding conditions in relatively few trials. Various modifications of my invention will occur to those skilled in the art from the above description and can be made without departing from the spirit or scope of my invention.

I claim:

1. Apparatus for use with a continuous plastics extruder for forming articles from thermoplastic material by blow molding comprising, in combination, two tubing die heads positioned for downward extrusion, said die heads each being equipped with a mandrel containing a central bore, the orifice of each die being formed by the tip of said mandrel and an outer adjustable bushing which can be positioned either concentric or eccentric to said mandrel, valved conduit means for alternately supplying molten thermoplastic in a substantially continuous stream from said extruder to each of said die heads, a pair of opposing mold halves positionable immediately below each of said die heads, the members of each said pair being horizontally movable in opposition to and from a position in registry with the orifice of the associated die head, means for introducing gas under pressure to the bore of each of said mandrels, two power actuated knife blades which are elongated and flexible and each is incased in an arcuate sheath in which the blade turns a right angle, each of said blades being positioned adjacent one of said die heads with the path of travel of each blade lying along the face of the associated die head and intercepting the path of the extrudate, and automatic timing means for cyclic operation of said valved conduit means, said mold halves, said means for introducing gas and said knife blades.

2. Apparatus for use with a continuous plastics extruder for forming articles from thermoplastic polymer by blow molding comprising, in combination, two parison die heads positioned for downward extrusion, each of said die heads being equipped with a mandrel containing an axial bore and carrying a replaceable tip which together with an adjustable bushing which can be positioned either concentric or eccentric to said mandrel in the die head forms the annular orifice of the die head, a three-way plug valve, two conduits connecting each of said die heads to an outlet of said plug valve, a third conduit connected to the common inlet of said plug valve and connectable to the nozzle of said extruder, a first air cylinder linked to said plug valve for positioning same, a pair of mold halves positionable immediately below each of said die heads, a platen supporting each mold half, second and third air cylinders connected each to a platen of a mold pair and positioned in opposing relation on a horizontal first platform, a first pair of V-rails on said first platform supporting the platens connected to said second and third air cylinders which are motivated in unison to move the members of a mold pair to and from a position in registry with the orifice of the associated die head, fourth and fifth air cylinders on a second platform carrying a second pair of V-rails and connected to platens of the other pair of mold halves in similar fashion, said platforms having openings directly below the die heads, means for introducing blowing air under pressure to the bore of each of said mandrels and thereafter venting same, two flexible knife blades, each of said blades being encased in an arcuate sheath, attached to the piston of an air cylinder and positioned adjacent one of said die heads with the path of travel of the cutting edge of each blade lying along the face of the associated die head and across its orifice, valve means in the air supply to the air cylinder of each knife controlling the ejection and retraction of that knife, a conveyor belt between and below said platforms for receiving severed molded items, a chute between said belt and said platforms for directing molded items falling between the openings in said platforms onto said belt, a blower for circulating air around the molded items as they travel on said belt, and automatic timing means electrically controlling the air supply to said air cylinders and said mandrels for cyclic operation of said plug valve, mold halves, blowing air and knife blades.

3. Apparatus for use with a continuous plastics extruder for forming articles from thermoplastic polymer by blow molding comprising, in combination, first and second parison dies containing mandrels through which blowing air is admitted, means for supplying pressurized blowing air to said mandrels and thereafter venting same including first and second electrically actuated valves in first and second air lines to said first and second dies respectively, a three-way valve for directing alternately a supply of molten polymer to each of said dies, a first air cylinder motivating said three-way valve, first electrically actuated valving means in the air supply to said first cylinder for reversing the position of same, a first pair of mold halves adjacent said first die and motivated to open and closed positions by second and third air cylinders, second electrically actuated valving means in the air supply to said second and third air cylinders for reversing the position of same, a second pair of mold halves adjacent said second die and motivated to open and closed positions by fourth and fifth air cylinders, third electrically actuated valving means in the air supply to said fourth and fifth air cylinders for reversing the position of same, first and second cutting means for severing the parison from said first and second dies respectively, sixth and seventh air cylinders motivating said first and second cutting means respectively, third and fourth electrically actuated valves in the air lines to said sixth and seventh cylinders respectively, and an electrical timing circuit controlling the sequence of operation of said valves and valving means comprising first and second timers, each timer having a plurality of contacts which close and open at preset intervals during the operation of said timer, said contacts including a first set of contacts in each timer completing a circuit which provides power for operation of that timer, a second set of contacts in each timer completing a circuit which initiates operation of the other timer, a third set of contacts in each timer completing a circuit connecting a power source to said first valving means, a fourth and a fifth set of contacts in said first timer each completing a circuit connecting a power source to said second valving means, a fourth and a fifth set of contacts in said second timer each completing a circuit connecting a power source to said third valving means, a sixth set of contacts in each of said first and second timers each completing a circuit which connects a power source to said first and second valves respectively, and a seventh set of contacts in each of said first and second timers each completing a circuit which connects a power source to said third and fourth valves respectively, and manually operated means for setting said first timer in operation.

4. The apparatus of claim 3 wherein the air supply to said second, third, fourth and fifth air cylinders includes valve means for varying the speed of operation of said cylinders.

5. The apparatus of claim 3 wherein said means for supplying pressurized blowing air includes valve means for varying the pressure of said blowing air at said mandrels.

6. In a blow molding apparatus for use with a single extruder having a valved exit alternately feeding plural discharge paths, improved valving means for alternately directing the flow of polymer from said extruder through said discharge paths comprising a valve body, a tapered plug, tungsten carbide coatings covering the contacting surfaces of said body and plug, and a bottom plate member containing a bleed hole to permit extravasation of polymer passing between said surfaces.

7. Apparatus for use with a continuous plastics extruder for forming articles from thermoplastic polymer by blow molding comprising, in combination, first and second parison dies, first and second mandrels through which blowing gas is admitted to the parisons formed by said first and second dies respectively, first and second means for separately supplying pressurized blowing gas to said mandrels, valving means for alternately directing a supply of molten polymer to each of said dies, a first and second pair of mold halves adjacent said first and second dies respectively, separate means for moving said first and second pairs of mold halves to open and closed positions, first and second cutting means for severing the parison from said first and second dies respectively, separate means for motivating said first and second cutting means, and an electrical timing circuit controlling the sequence of operation of said valving means, blowing gas, mold halves and cutting means comprising first and second timers, first and second sets of contacts closed and opened at intervals timed by said first and second timers respectively, said first set of contacts being connected to sustain the operation of said first timer for an interval, actuate said valving means, said means for moving said first set of mold halves, said first gas supplying means, and said means for motivating said first cutting means, and initiate the operation of said second timer, and said second set of contacts being connected to sustain the operation of said second timer for an interval, actuate said valving means, said means for moving said second set of mold halves, said second gas supplying means, and said means for motivating said second cutting means, and initiate the operation of said first timer.

References Cited in the file of this patent
UNITED STATES PATENTS

| | | |
|---|---|---|
| 2,574,555 | Galloway | Nov. 13, 1951 |
| 2,632,202 | Haines | Mar. 24, 1953 |
| 2,724,860 | Strong | Nov. 29, 1955 |
| 2,780,835 | Sherman | Feb. 12, 1957 |
| 2,854,691 | Strong | Oct. 7, 1958 |
| 2,859,476 | Lainson | Nov. 11, 1958 |
| 2,903,740 | Parfrey | Sept. 15, 1959 |